United States Patent
Segawa

(10) Patent No.: US 10,043,301 B2
(45) Date of Patent: *Aug. 7, 2018

(54) VECTOR DATA PROCESSOR, IMAGE RECORDING SYSTEM, VECTOR DATA PROCESSING METHOD, AND COMPUTER-READABLE MEDIUM

(71) Applicant: SCREEN HOLDINGS CO., LTD., Kyoto (JP)

(72) Inventor: Hiroyuki Segawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,639

(22) Filed: Apr. 25, 2017

(65) Prior Publication Data

US 2017/0337718 A1 Nov. 23, 2017

Related U.S. Application Data

(63) Continuation of application No. 14/594,066, filed on Jan. 9, 2015, now Pat. No. 9,697,631.

(30) Foreign Application Priority Data

Feb. 18, 2014 (JP) ................................ 2014-028315

(51) Int. Cl.
*G09G 5/00* (2006.01)
*G06T 11/60* (2006.01)
(Continued)

(52) U.S. Cl.
CPC ............... *G06T 11/60* (2013.01); *G06T 5/30* (2013.01); *G06T 11/20* (2013.01); *G06T 2207/20044* (2013.01); *G06T 2207/30176* (2013.01)

(58) Field of Classification Search
None
See application file for complete search history.

(56) References Cited

U.S. PATENT DOCUMENTS 5,459,828 A 10/1995 Zack et al.
5,473,709 A 12/1995 Aoki
(Continued)

FOREIGN PATENT DOCUMENTS

CN 102998908 A 3/2013
JP H06-118935 A 4/1994
(Continued)

OTHER PUBLICATIONS

U.S. Notice of Allowance dated Mar. 1, 2017 issued in U.S. Appl. No. 14/594,066.
(Continued)

*Primary Examiner* — Martin Mushambo
(74) *Attorney, Agent, or Firm* — McDermott Will & Emery LLP

(57) ABSTRACT

A vector data processor includes a thinning part, a central line acquiring part, and a superimposing part. A target figure includes a linear figure. The thinning part processes target vector data to acquire thinned data by thinning the target figure indicated by the target vector data. The central line acquiring part processes the target vector data to acquire central line data that indicates a central line of the target figure. The superimposing part generates data that includes an instruction to record a combined figure obtained by superimposing the thinned figure and the central line one above the other. Superimposing the thinned figure and the central line enables the target figure to be thinned without line becoming broken. The shape of a rasterized figure can be approximated to the shape of a figure indicated by original data.

15 Claims, 16 Drawing Sheets

(51) Int. Cl.
*G06T 5/30* (2006.01)
*G06T 11/20* (2006.01)

(56) References Cited

U.S. PATENT DOCUMENTS

| | | | |
|---|---|---|---|
| 5,867,172 | A | 2/1999 | Fujisawa et al. |
| 8,922,562 | B2 * | 12/2014 | Dykes .................. G06T 11/206 345/440 |
| 2003/0137699 | A1 | 7/2003 | Narazaki et al. |
| 2006/0227194 | A1 | 10/2006 | Hoshino |
| 2007/0030359 | A1 | 2/2007 | Ito et al. |
| 2007/0230809 | A1 | 10/2007 | Ishida |
| 2011/0069326 | A1 | 3/2011 | Oishi |
| 2011/0157614 | A1 | 6/2011 | Ueda et al. |
| 2012/0257220 | A1 | 10/2012 | Sagimori |
| 2013/0057552 | A1 | 3/2013 | Yoshiwa et al. |

FOREIGN PATENT DOCUMENTS

| | | |
|---|---|---|
| JP | H07-28451 A | 1/1995 |
| JP | H07-191657 A | 7/1995 |
| JP | H08-83060 A | 3/1996 |
| JP | 2001-301248 A | 10/2001 |
| JP | 2003-219171 A | 7/2003 |
| JP | 2010-145145 A | 7/2010 |
| JP | 2011-170480 A | 9/2011 |

OTHER PUBLICATIONS

U.S. Final Office Action dated Nov. 16, 2016 issued in U.S. Appl. No. 14/594,066.

U.S. Office Action dated May 12, 2016 issued in U.S. Appl. No. 14/594,066.

European Search Report dated Jul. 16, 2015 issued in European Patent Application No. 15151130.0.

J. Wang, et al., "Renovating Flawed Handwriting to Improve Recognition," Tencon 99, Proceedings of the IEEE Region 10 Conference Cheju Island, South Korea, Sep. 15-17, 1999, vol. 2, pp. 1323-1326.

\* cited by examiner

FIG. 14

```
/DS_Layer <</DS_LayID 0 >>BDC
/OC /MC0 BDC
/DS_TrapS /MC1 BDC
0 0.8 0 1 k  ←――――― 256        252
q 1 0 0 1 83.44655 788.2981 cm
0 0 m
-0.89136 -0.14496 l
-1.26071 -0.17059 -1.57016 -0.38214 -1.70741 -0.56207 c
-1.78123 -0.65881 -1.8815 -0.87781 -1.89323 -0.92975 c
-1.91261 -0.97864 l
-2.69719 -2.30988 l
-2.15785 -3.05737 l
-2.14597 -3.03394 -2.12877 -3.01349 -2.10765 -2.9978 c
-1.11653 -2.26056 l
-0.93207 -0.68549 l
-0.92918 -0.66083 -0.92093 -0.63708 -0.90788 -0.61597 c
-0.89484 -0.59485 -0.87733 -0.57678 -0.85658 -0.56317 c
0 0 l
h
-2.09183 -3.74615 m
-2.15613 -3.27991 l      ―253
-2.53989 -3.74615 l
-2.09183 -3.74615 l
h
f
Q
0 0.8 0 1 K  ―――― 255
0 w 2 j  ←
q 1 0 0 1 81.78763 785.42212 cm
0 0 m
0.32645 1.95655 l
0.33428 2.02458 l      ― 254
0.33665 2.35874 l
0.34238 2.77587 l
0.34665 2.81134 l
S
Q
EMC
EMC
EMC
```

*FIG. 15*

| 5pt | 1234567890!#$% |
|---|---|
| 4pt | abcdefghijklmnopqrstu |
| 4pt | 1234567890!#$%&@() |
| 3pt | abcdefghijklmnopqrstuvwxyzAB |
| 3pt | 1234567890!#$%&@()+-*/=<>? |

*FIG. 16A*

| 5pt | 1234567890!#$% |
|---|---|
| 4pt | abcdefghijklmnopqrstu |
| 4pt | 1234567890!#$%&@() |
| 3pt | abcdefghijklmnopqrstuvwxyzAB |
| 3pt | 1234567890!#$%&@()+-*/=<>? |

*FIG. 16B*

| 5pt | 1234567890!#$% |
|---|---|
| 4pt | abcdefghijklmnopqrstu |
| 4pt | 1234567890!#$%&@() |
| 3pt | abcdefghijklmnopqrstuvwxyzAB |
| 3pt | 1234567890!#$%&@()+-*/=<>? |

FIG. 17

| 5pt | 1234567890!#$% |
| 4pt | abcdefghijklmnopqrstu |
| 4pt | 1234567890!#$%&@() |
| 3pt | abcdefghijklmnopqrstuvwxyzAB |
| 3pt | 1234567890!#$%&@()+-*/=<>? |

容量賞味期限使
67890hppt:/

容量賞味期限使
67890hppt:/

容量賞味期限使
67890hppt:/

FIG. 19A

3456789C
]容量賞味期限(
567890hppt;

FIG. 19B

3456789(
]容量賞味期限
567890hppt

FIG. 19C

456789(
容量賞味期限
67890hppt

FIG. 20A

3456789
]容量賞味期limit
567890hpp

3456789
内容量賞味期限
567890hpp

3456789
内容量賞味期限
567890hpp

VECTOR DATA PROCESSOR, IMAGE RECORDING SYSTEM, VECTOR DATA PROCESSING METHOD, AND COMPUTER-READABLE MEDIUM

CROSS-REFERENCE TO RELATED APPLICATION

This application is a continuation patent application of U.S. patent application Ser. No. 14/594,066, filed on Jan. 9, 2015 which in turn claims under 35 U.S.C. § 119(a) the benefit of priority to Japanese Patent Application No. 2014-028315, filed on Feb. 18, 2014, the entire contents of which are incorporated herein by reference.

TECHNICAL FIELD

The present invention relates to a technique for processing vector data before the vector data is converted into raster data for image recording.

BACKGROUND ART

Several techniques are conventionally known for performing various types of processing on raster data in advance in the case of recording an image with a method such as an inkjet method or an electrophotographic method. For example, the background art section of Japanese Patent Application Laid-Open No. 2003-219171 (Document 1) refers to a technique for correcting a halftone dot area in advance to deal with the phenomenon of dot gain in which halftone dots increase in size as ink spreads. Document 1 discloses a technique for performing thickening or thinning processing by changing densities of edge portions of a halftone dot image to deal with a difference in dot gain between an output device for proofreading and a general printer.

Japanese Patent Application Laid-Open No. 2010-145145, which relates to the field of pattern inspection, discloses that, in the acquisition of a master pattern, a reference pattern that includes a background pattern and a product pattern is used to obtain a reference distance pattern by assigning to each pixel belonging to the product pattern a distance data piece that indicates a distance of the pixel from the boundary.

The reference distance pattern is then used to obtain a pixel-deleted image by deleting pixels until each pixel in the reference distance pattern has no surrounding pixels that have greater distance data pieces than that of the pixel. The reference distance pattern is also used to obtain a line-thinned image by deleting pixels until the line width of the reference distance pattern becomes the minimum. The pixel-deleted image and the line-thinned image are then combined to obtain a reference skeleton pattern. The reference skeleton pattern is subjected to inverse distance conversion (i.e., the reference skeleton pattern is thickened) to obtain the master pattern.

Japanese Patent Application Laid-Open No. 2001-301248 discloses a technique for use with a plurality of books that include a fixed part and a variable part and in which the fixed part is shared and only the variable part is rasterized.

Incidentally, in the case of recording superfine characters or line images, converting vector data into raster data (i.e., rasterized) with a raster image processor (RIP) may produce thickened and indistinguishable lines. This is due to the facts that outlined characters have no Hint information to be referenced in the case of recording superfine characters and that pixels representing characters and figures are determined to be writing pixels to prevent superfine parts from becoming broken due to rasterization.

SUMMARY OF INVENTION

The present invention is intended for a vector data processor for processing vector data before the vector data is converted into raster data for image recording, and it is an object of the present invention to appropriately deal with thickening or becoming indistinguishable of characters or linear figures through processing performed prior to rasterization.

The vector data processor according to an aspect of the present invention includes a thinning part that processes target vector data indicating an outline of a target figure that includes a linear figure having a thickness, to acquire thinned data that is vector data indicating a thinned figure obtained by thinning the target figure, a central line acquiring part that processes the target vector data to acquire central line data that is vector data indicating at least part of a central line of the target figure, and a superimposing part that generates data that includes an instruction to record a combined figure obtained by superimposing the thinned figure and the central line one on the other.

According to the present invention, the processing performed on the vector data prior to rasterization allows figures to be thinned while preventing lines from becoming broken. This consequently makes it possible to approximate the shape of a rasterized figure to the shape of a figure indicated by original data.

Preferably, the target figure represents a character.

More preferably, original image data includes a plurality of layers, and all figure element data that is vector data indicating an outline of a figure, out of figure element data that is included in at least one of the plurality of layers, is the target vector data.

The central line acquiring part may acquire only part of the central line of the target figure. In this case, the part of the central line preferably includes the central line at a position where the target figure is broken in the processing performed by the thinning part.

The thinning part checks whether a value of a variable that indicates an amount of thinning associated with the target vector data has been determined, and, if the value has not been determined, determines an amount of thinning that corresponds to the target vector data. This enables automatic determination of an adequate amount of thinning. Alternatively, the thinning part may receive input of an amount of thinning that is specified by a user.

The present invention is also intended for an image recording system that includes the above-described vector data processor. The image recording system further includes a RIP part that converts data output from the superimposing part into raster data, and an image recording apparatus that records an image to a recording medium in accordance with the raster data.

Preferably, the image recording system further includes a display part that displays a plurality of figure elements indicated by original image data, and an input part that accepts an operation of selecting a figure that is included in the plurality of figure elements as the target figure.

In a preferable embodiment, the image recording system further includes a raster data composition part that combines fixed raster data that is raster data prepared in advance and variable raster data that is generated by the RIP part to generate composite raster data. The image recording apparatus records an image to a recording medium in accordance with the composite raster data.

The present invention is also intended for a vector data processing method of processing vector data before the vector data is converted into raster data for image recording.

The present invention is further intended for a computer-readable medium that stores a program for causing a computer to execute the above-described method.

These and other objects, features, aspects and advantages of the present invention will become more apparent from the following detailed description of the present invention when taken in conjunction with the accompanying drawings.

BRIEF DESCRIPTION OF DRAWINGS

FIG. 14 illustrates a description of the combined figure;

FIG. 15 illustrates an example of an original image;

FIG. 16A illustrates a result obtained by performing only thinning processing on the original image;

FIG. 16B illustrates a central line acquired from the original image;

FIG. 17 illustrates a result obtained through processing performed by the vector data processor:

FIG. 18A illustrates characters represented in a font;

FIG. 18B illustrates characters represented by vector data;

FIG. 18C illustrates characters processed by the vector data processor;

FIG. 19A illustrates characters in FIG. 18A that have been rasterized;

FIG. 19B illustrates characters in FIG. 18B that have been rasterized;

FIG. 19C illustrates characters in FIG. 18C that have been rasterized;

FIG. 20A illustrates characters in FIG. 19A that have been recorded;

DESCRIPTION OF EMBODIMENTS

Figure 1:
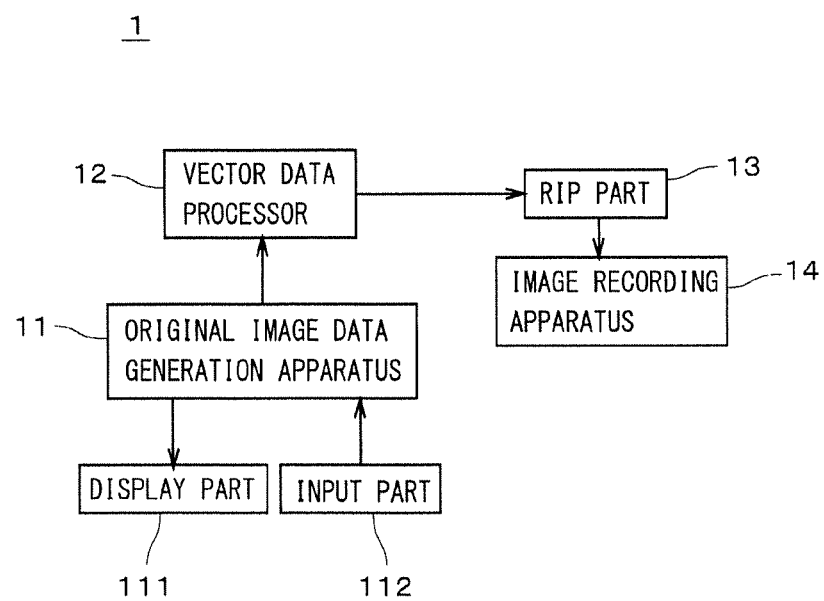
FIG. 1 illustrates a configuration of an image recording system.

FIG. 1 is a block diagram illustrating a configuration of an image recording system 1 according to an embodiment of the present invention. The image recording system 1 includes an original image data generation apparatus 11, a vector data processor 12, an RIP part 13, and an image recording apparatus 14. The original image data generation apparatus 11 is connected to a display part 111 and an input part 112. The display part 111 and the input part 112 may be configured in various forms in the image recording system 1. For example, the display part 111 and the input part 112 may be part of the original image data generation apparatus 11, or may be part of the vector data processor 12 as will be described later.

The present embodiment describes an example of the case where the original image data generation apparatus 11 and the vector data processor 12 are implemented by a single computer, but the original image data generation apparatus 11, the vector data processor 12, and the RIP part 13 may be implemented in various forms. For example, the original image data generation apparatus 11, the vector data processor 12, and the RIP part 13 may all be implemented by a single computer, or only the vector data processor 12 and the RIP part 13 may be implemented by a single computer. The RIP part 13 may be implemented by a computer of the image recording apparatus 14. Similarly, the vector data processor 12 may be implemented by the computer of the image recording apparatus 14.

The vector data processor 12 processes vector data that is included in original image data. In other words, the vector data processor 12 processes vector data before the vector data is converted into raster data for image recording. This processing makes the vector data suited to rasterization and recording. The RIP part 13 generates raster data from the original image data. The image recording apparatus 14 records an image in accordance with the raster data to a recording medium.

Figure 2:
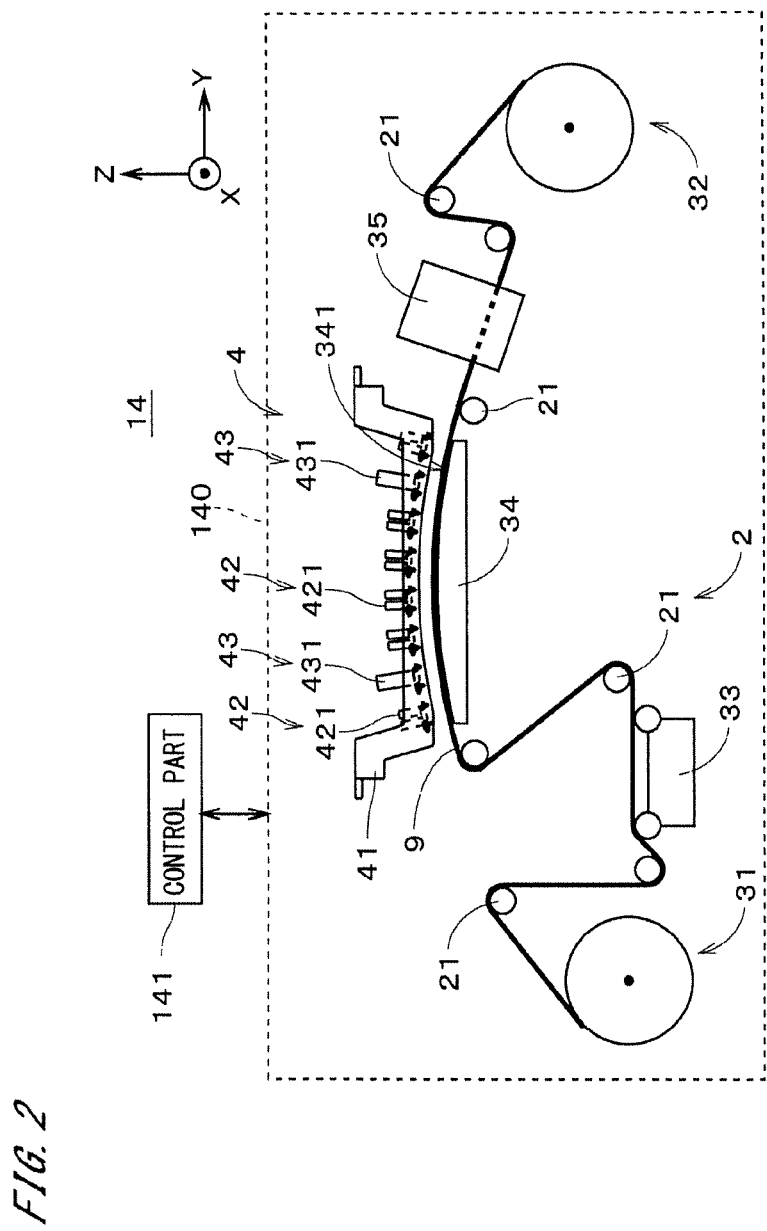
FIG. 2 illustrates a configuration of an image recording apparatus.

FIG. 2 illustrates a configuration of the image recording apparatus 14. The image recording apparatus 14 is an apparatus for recording an image to a recording medium 9 in continuous sheet form, such as continuous form paper, by ejecting fine droplets of ink toward the recording material 9. In FIG. 2, two horizontal directions perpendicular to each other are assumed to be X and Y directions, and a vertical direction perpendicular to the X and Y directions is assumed to be a Z direction. The X and Y directions are not necessarily always in the horizontal direction, and the Z direction is not necessarily always in the vertical direction.

The image recording apparatus 14 includes a main body 140 and a control part 141. The main body 140 includes a scanning mechanism 2 for moving the recording medium 9, and a head unit 4 that ejects fine droplets of UV curing ink toward the recording medium 9 being moved by the scanning mechanism 2. The scanning mechanism 2 includes a plurality of rollers 21 that are each long in the X direction in FIG. 2. In the vicinity of the roller 21 that is disposed furthest to the −Y side is a supply part 31 that holds a roll (supply roll) of the recording medium 9. In the vicinity of the roller 21 that is disposed furthest to the +Y side is a taking-up part 32 that holds a roll (taking-up roll) of the recording medium 9. In the image recording apparatus 14, some of the rollers 21 of the scanning mechanism 2 rotate at a constant rotational speed about an axis parallel to the X direction so that the recording medium 9 moves at a constant speed along a predetermined travel path from the supply part 31 to the taking-up part 32.

On the travel path of the recording medium 9, a guiding part 34 is provided at a position facing the head unit 4. The guiding part 34 has a curved surface 341 (hereinafter, referred to as a "guide surface 341") that is part of a cylindrical surface located immediately under the head unit 4 (on the −Z side) and is centered on a virtual axis parallel to the X direction. The recording medium 9 moves along the smooth guide surface 341 under the head unit 4. The travel path of the recording medium 9 thus curves upward toward the head unit 4 at a position facing the head unit 4, and accordingly stretches the recording medium 9 along the guide surface 341.

The travel path of the recording medium 9 is also provided with a skew correction part 33 for correcting skewing of the recording medium 9 and a curing part 35 for emitting ultraviolet rays for curing ink. The skew correction part 33 is disposed between the supply part 31 and the guiding part 34, and the curing part 35 is disposed between the guiding part 34 and the taking-up part 32. Note that the image recording apparatus 14 may further include other constituent elements such as a pre-processing part for performing predetermined pre-processing on the recording medium 9.

The head unit 4 includes a plurality of head assemblies 42 having heads 421, a plurality of emitting assemblies 43 having emitting parts 431, and a base 41 that supports the head assemblies 42 and the emitting assemblies 43. The assemblies 42 and 43 are each long in the X direction and are arranged approximately in the Y direction (to be precise, the scanning direction).

One head assembly 42 that ejects a white ink is disposed furthest to the −Y side, and one emitting assembly 43 is disposed on the +Y side of this head assembly 42. On the +Y side of this emitting assembly 43 are four head assemblies 42 that respectively eject black (K), cyan (C), magenta (M), and yellow (Y) inks. On the +Y side of these four head assemblies 42 is one emitting assembly 43, and on the +Y side of this emitting assembly 43 is one head assembly 42 that ejects an ink of a predetermined specific color. The head unit 4 may also eject other types of ink, such as a clear (i.e., transparent) ink.

Figure 3:
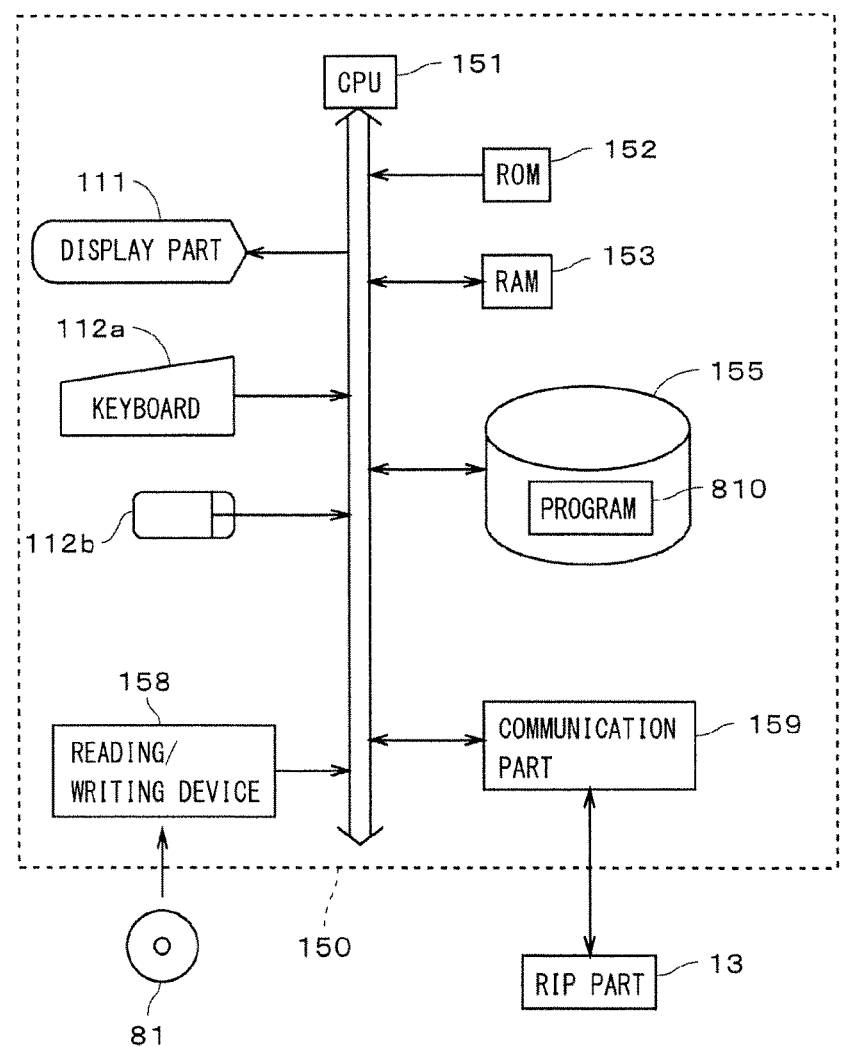
FIG. 3 illustrates a configuration of a computer.

FIG. 3 illustrates a configuration of a computer 150 that implements the original image data generation apparatus 11 and the vector data processor 12. The computer 150 has a configuration of a typical computer system that includes a CPU 151 that performs various types of computational processing, a ROM 152 that stores basic programs, and a RAM 153 that stores various types of information. The computer 150 further includes a fixed disk 155 that stores information, a display part 111 that displays various types of information, a keyboard 112a and a mouse 112b that serve as an input part 112 and receive input from an operator, a reading/writing device 158 that reads out or writes information from or to a computer-readable recording medium 81 such as an optical disk, a magnetic disk, or a magneto-optical disk, and a communication part 159 that communicates with the RIP part 13.

The computer 150 reads out a program 810 in advance from the recording medium 81 via the reading/writing device 158 and stores the program 810 in the fixed disk 155. The computer 150 then functions as the original image data generation apparatus 11 and the vector data processor 12 by the CPU 151 executing computational processing in accordance with the program 810 while using the RAM 153 and the fixed disk 155 (i.e., by the computer executing the program).

Figure 4:
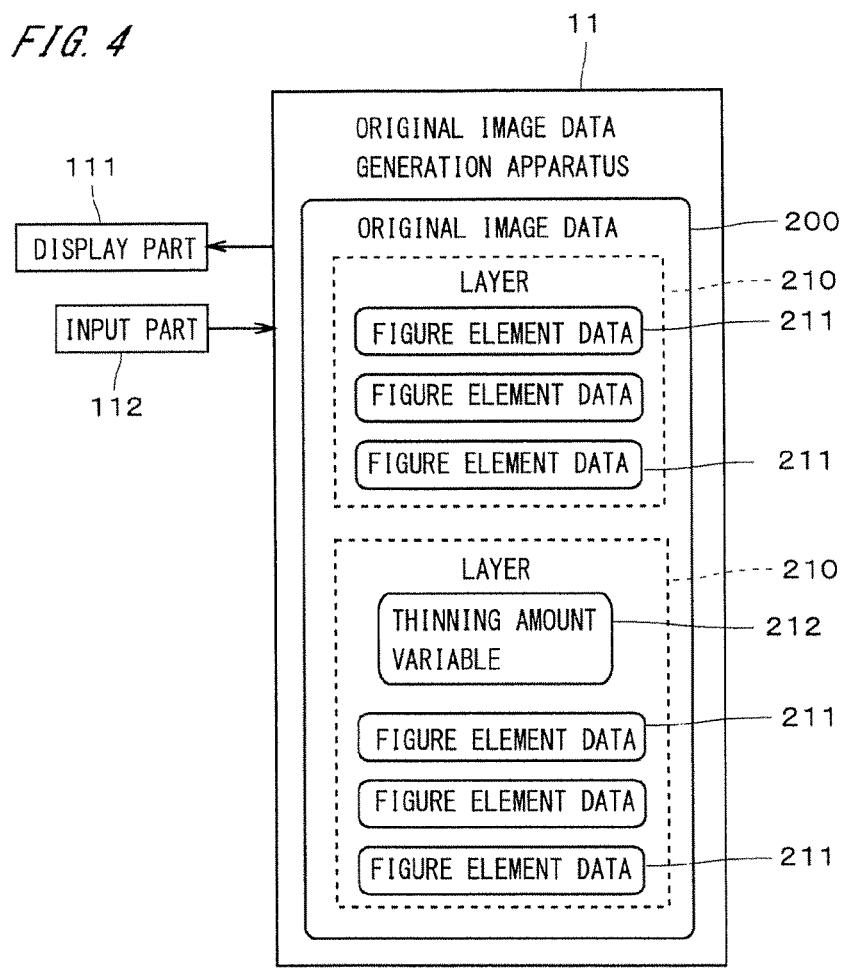
FIG. 4 illustrates an original image data generation apparatus and a structure of original image data.

FIG. 4 illustrates the original image data generation apparatus 11 and a structure of original image data 200 generated by the original image data generation apparatus 11. The original image data 200 is preferably written in a page description language. The original image data 200 is generated by a user of the original image data generation apparatus 11 operating the input part 112 while referring to display on the display part 111. For example, the computer executes Acrobat (Adobe Systems Incorporated, California, USA) to generate the original image data 200.

Figure 5:
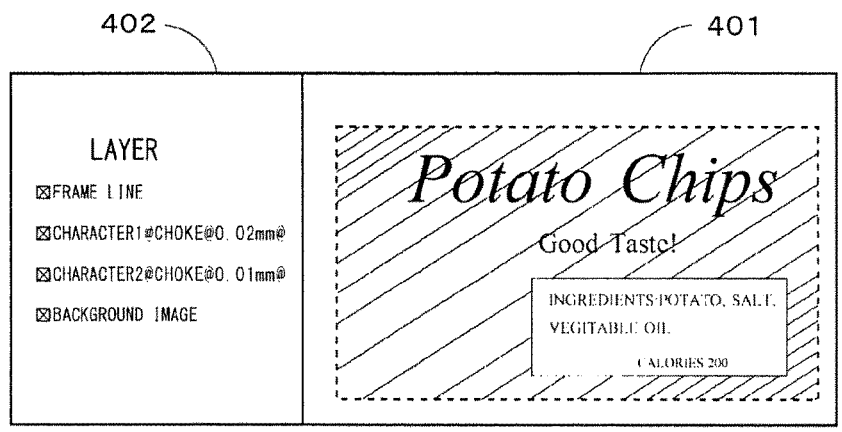
FIG. 5 illustrates example display on a display part.

The original image data 200 includes a plurality of layers 210. FIG. 4 illustrates only two of these layers 210. Each layer 210 includes object data corresponding to a plurality of objects, i.e., figure element data 211 corresponding to figure elements. In the following description, figure element data (or, vector data or raster data) that corresponds to a single figure element is represented as appropriate as a single countable figure element data piece 211. Some of the layers 210 include a thinning amount variable 212, which will be described later. FIG. 5 illustrates an image to be printed on a product package as example display on the display part 111 in which pieces of information of a plurality of layers 210 are superimposed one above another. The display includes an editing area 401 and an information area 402. The editing area 401 displays an image indicated by at least one of the layers 210 for a user to reference. Alternatively, it is also possible to hide all of the layers 210.

The information area 402 displays a list of names of the layers 210. A name with a checkbox that is checked indicates that the layer 210 having this name is currently being displayed in the editing area 401. The letters, e.g., "@CHOKE@0.02 mm@," following the name of the layer 210 indicates that the corresponding image is to be thinned by 0.02 mm. This information corresponds to the thinning amount variable 212 in FIG. 4. The unit of the amount of thinning may be appropriately changed to, for example, a point size corresponding to a character size, the number of pixels, or inches. In the present embodiment, information about thinning is associated with the layers 210.

Figure 6A:
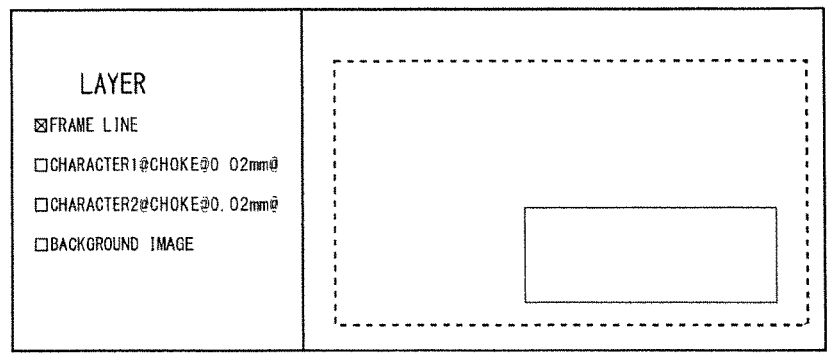
FIG. 6A illustrates an image of a layer.
Figure 6B:
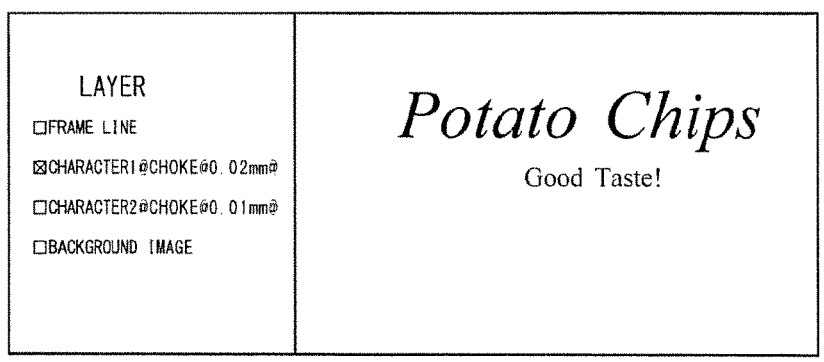
FIG. 6B illustrates an image of another layer.
Figure 6C:
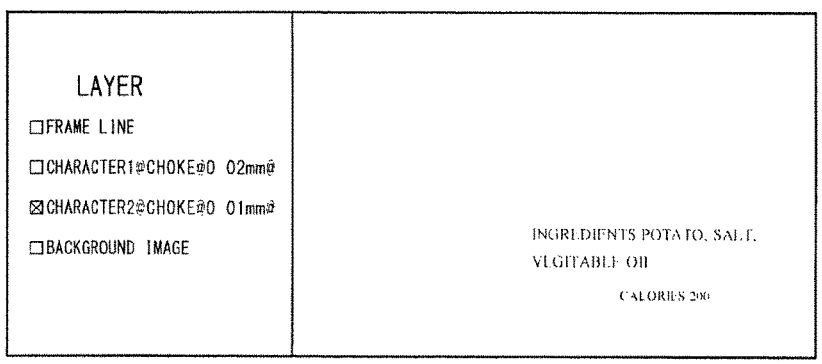
FIG. 6C illustrates an image of another layer.
Figure 6D:
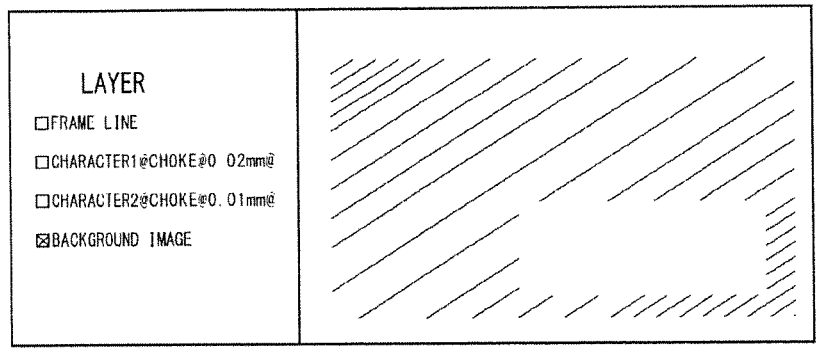
FIG. 6D illustrates an image of another layer.

FIGS. 6A to 6D illustrate images of each layer 210. FIG. 6A illustrates frame lines. FIG. 6B illustrates large characters. FIG. 6C illustrates small characters. FIG. 6D illustrates a background image. In the present embodiment, the background image corresponds to display of a single figure element data piece 211 that is raster data. Each character corresponds to display of a single figure element data piece 211. The characters are represented by vector data indicating outlines. This allows the correct characters to be recorded independently of the type of the image recording apparatus 14. Each frame line also corresponds to display of a single figure element data piece 211 that is vector data.

FIGS. 6A to 6D are merely one example, and the background image may correspond to, for example, display of a plurality of figure element data pieces 211, and some of these figure element data pieces 211 may be vector data. Similarly, some of the characters may be represented in a font expressed by an array of dots.

Figure 7:
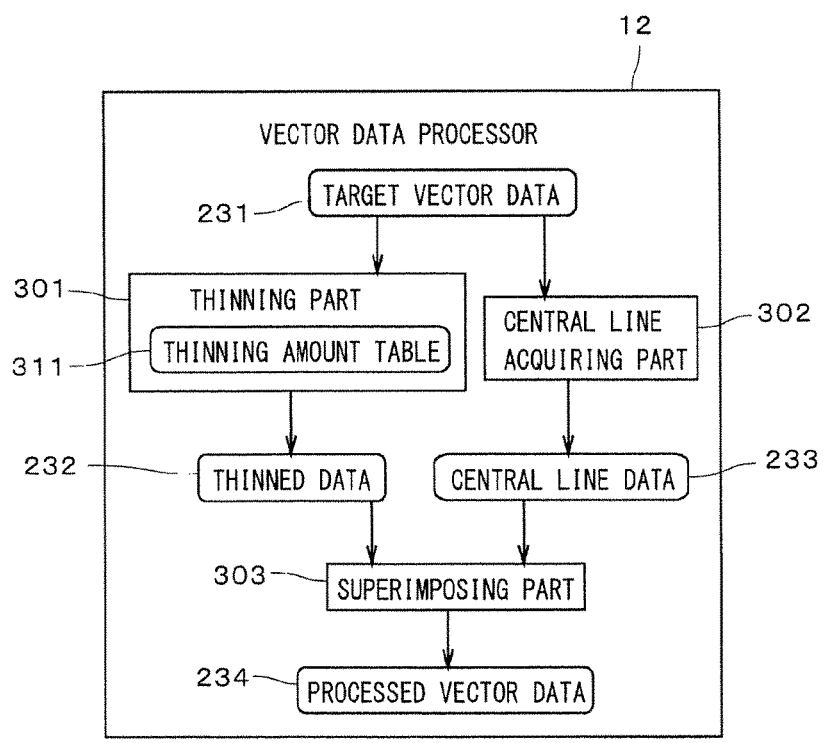
FIG. 7 illustrates a functional configuration of a vector data processor.

FIG. 7 illustrates a functional configuration of the vector data processor 12 that is implemented by the computer 150 executing the program 810. The vector data processor 12 includes a thinning part 301, a central line acquiring part 302, and a superimposing part 303. In practice, the vector data processor 12 also includes a control part that controls a sequence of operations of these functions. The functions illustrated in FIG. 7 may be implemented by a dedicated electric circuit, or may be partly implemented by a dedicated electric circuit.

Figure 8:
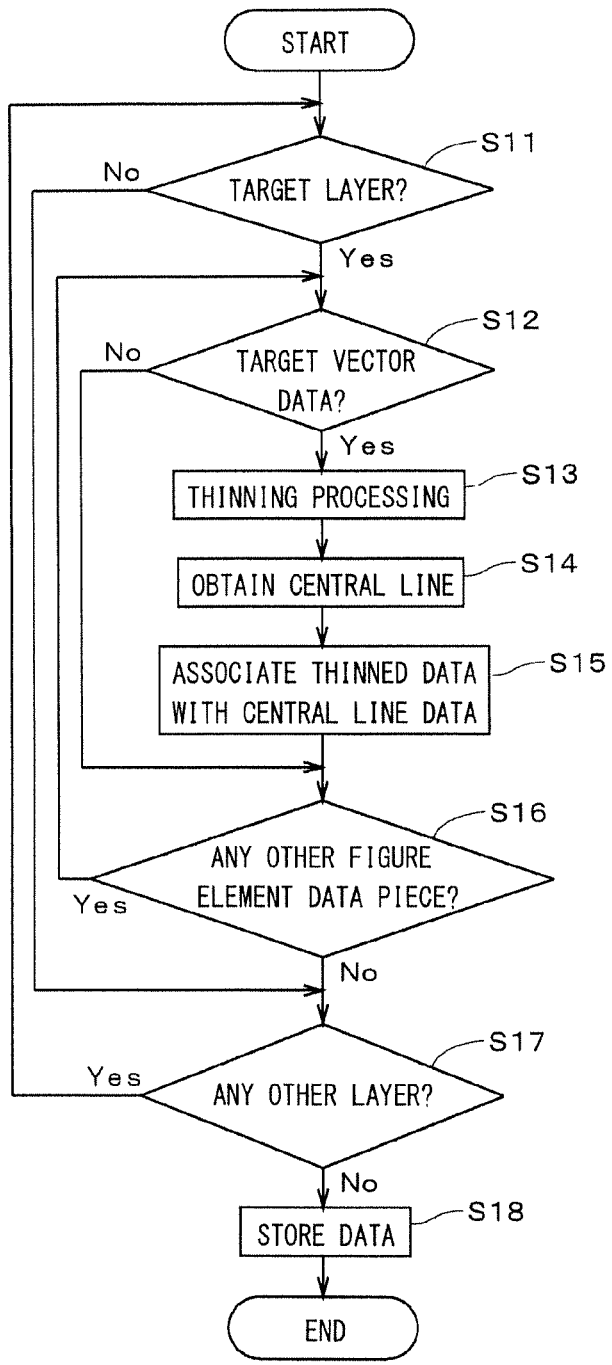
FIG. 8 is a flowchart of operations performed by the vector data processor.

FIG. 8 is a flowchart of operations performed by the vector data processor 12. Upon receiving input of information about the first layer 210, the vector data processor 12 checks whether the layer 210 is a layer to be processed (step S11). In the present embodiment, a layer with a name including "@CHOKE@" is assumed to be a layer to be processed. In the example in FIG. 5, the first "frame line" layer 210 is not a layer to be processed and figure element data pieces 211 are vector data that indicates polygonal lines and are not target vector data 231. The vector data processor 12 identifies the presence of the next layer, i.e., a "Character 1" layer 210, (step S17) and checks whether this layer 210 is a layer to be processed (step S11).

Since the "Character 1" layer 210 is a layer to be processed, the vector data processor 12 checks whether the first figure element data piece 211 in this layer 210 is data to be processed (step S12). In the present embodiment, all figure element data pieces 211 that belong to the "Character 1" layer 210 are vector data and thus will be determined as data to be processed. Hereinafter, vector data to be processed is referred to as "target vector data 231." Examples of figure element data pieces 211 that are not data to be processed include polygonal lines (strokes), gradation graphics, and font characters.

Figure 9:
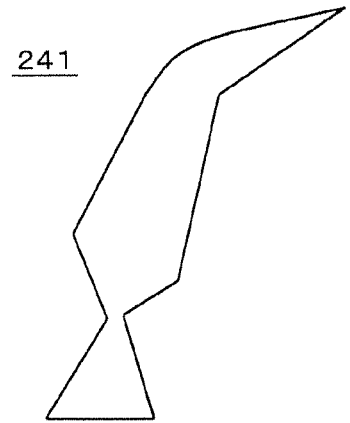
FIG. 9 illustrates an example of a target figure.
Figure 10A:
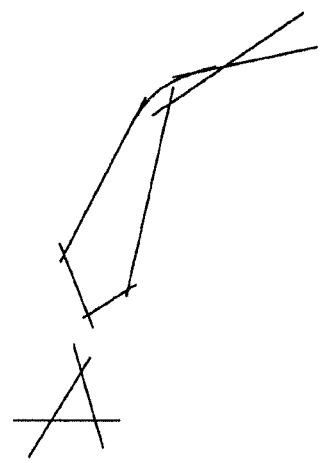
FIG. 10A illustrates thinning processing.

The target vector data 231 is first thinned by the thinning part 301 (step S13). All the target vector data 231 that belongs to the "Character 1" layer 210 is thinned by an amount of thinning of 0.02 mm. FIG. 9 illustrates an example of a target FIG. 241 that is indicated by the target vector data 231 but is not limited to a character. The thinning processing includes moving line segments of the target FIG. 241 inward by the amount of thinning as illustrated in FIG. 10A. Line segments that are isolated from others are appropriately extended to keep intersecting with others. Then, lines that extend off the edges of closed areas are deleted, yielding a thinned FIG. 242 illustrated in FIG. 10B. Hereinafter, vector data that indicates the thinned FIG. 242 is referred to as "thinned data 232."

Figure 11A:
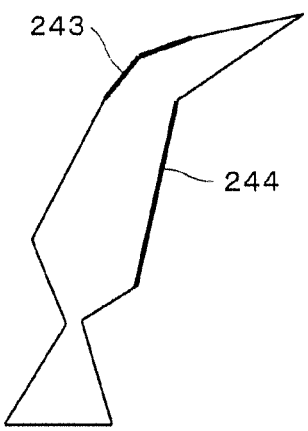
FIG. 11A illustrates a target figure during the process of acquiring a central line.
Figure 11B:
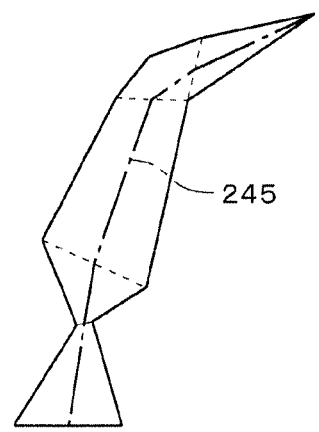
FIG. 11B illustrates a central line.

On the other hand, the target vector data 231 is also processed by the central line acquiring part 302 to acquire vector data that indicates a central line of the target FIG. 241 (step S14). In the acquisition of the central line, a curve is first approximated to a polygonal line 243 as illustrated in FIG. 11A. If a plurality of line segments that overlap one another or are aligned in a line represent a single line segment, these line segments are integrated into a single line segment 244. Next, a plurality of pairs of line segments, each pair including line segments opposed to each other, are acquired from long line segments by searching for line segments that are opposed to each other. A polygonal line that passes through the centers of these pairs of line segments is then acquired as a central line 245 as illustrated in FIG. 11B. Hereinafter, vector data that indicates the central line 245 is referred to as "central line data 233." Note that, in the actual acquisition of the central line, the amount of thinning in the thinning processing is also referenced to determine the position of the central line.

The thinning processing (step S13) and the acquisition of the central line (step S14) may be performed in the reverse order, or may be performed in parallel. The thinned data 232 and the central line data 233 are input to the superimposing part 303, which then superimposes the thinned FIG. 242 and the central line 245 one above the other to generate processed vector data 234 that instructs the image recording apparatus 14 to record a combined FIG. 246 illustrated in FIG. 12 (step S15). The processed vector data 234 may be data that is handled as a single file indicating the combined FIG. 246, or may be in a form such that the thinned data 232 and the central line data 233 are individually managed and associated with information indicating that the thinned FIG. 242 and the central line 245 are superimposed one above the other and recorded to a single recording medium. In other words, the processed vector data 234 may be in any form that can at least show the association between the thinned data 232 and the central line data 233.

Figure 13:
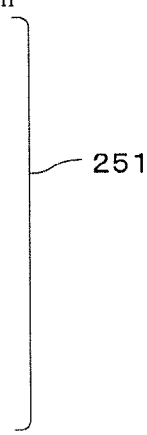
FIG. 13 illustrates a description of the target figure.

FIG. 13 illustrates a description in portable document format (PDF) showing the drawing of the target FIG. 241 in FIG. 9, i.e. the content of a PDF file. While FIG. 13 illustrates a description of a single target figure, such a description typically includes instructions to record a plurality of target figures, and each part of the description that corresponds to each target figure is handled as the aforementioned target vector data 231. Note that the PDF is a page description language.

A range of the description indicated by reference numeral 251 corresponds to the target vector data 231, the details of which will be omitted. In FIG. 13, a symbol "m" represents moving a starting point, i.e., moving current coordinates of writing, and "x y " represents moving the starting point to (x, y). A symbol "l" represents writing a straight line from the current coordinates, and "x y l" represents writing a straight line from the current coordinates to a partway point (x, y), and changing the current coordinates to (x, y). A symbol "v" represents writing a Bezier curve, and "x1 y1 x2 y2 v" represents using (x1, y1) as a control point and wiring a Bezier curve from the current coordinates to (x2, y2). A symbol "h" represents connecting the final partway point and the starting point to close a line drawing. A symbol "f" represents filling in the closed area.

Figure 10B:
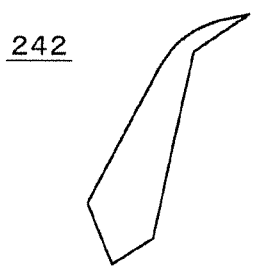
FIG. 10B illustrates a thinned figure.
Figure 10B:
Figure 12:
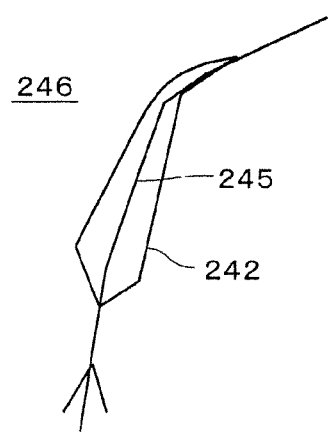
FIG. 12 illustrates a combined figure.

FIG. 14 illustrates a description in the PDF showing the drawing of the combined FIG. 246 in FIG. 12. Ranges of the description indicated by reference numerals 252 and 253 correspond to the thinned data 232. A range of the description indicated by reference numeral 254 corresponds to the central line data 233. As illustrated in FIG. 10B, the thinned FIG. 242 includes two divided areas, and these two areas are described in same manner as in FIG. 13. The range 254 of the central line 245, which is a polygonal line, has a symbol "S" added to the end to indicate that the central line is a polygonal line. A description "0 w" in line 255 indicates that the line width is one pixel. The central line 245 is thus recorded at the minimum line width. A description "0 0.8 0 1 k" in line 256 indicates halftone dot percentages of CMYK.

If processing has been completed for the single target vector data piece 231, the vector data processor 12 checks for the presence or absence of the next figure element data piece 211 in the target layer 210 as shown in FIG. 8 (step S16). If there is a figure element data piece, the procedure returns to step S12 to check whether this figure element data piece 211 is target vector data 231. In the present embodiment, steps S13 to S15 are performed for all of the figure element data pieces 211 in the "Character 1" layer 210.

If processing has been completed for the "Character 1" layer 210, the procedure proceeds to processing for a "Character 2" layer 210 (step S17). All figure element data pieces 211 that belong to the "Character 2" layer 210 are also target vector data 231 and are thus converted into processed vector data 234. Since the next "background image" layer 210 is not a layer to be processed, steps S13 to S15 are not performed.

The above-described processing yields processed image data in which the target vector data 231 in the original image data 200 is replaced by the processed vector data 234. The processed vector data 234, which is output from the superimposing part 303, is temporarily stored in a storage part, such as a fixed disk (step S18). Subsequently, the processed image data 234 is input to the RIP part 13 and converted into raster data for each color component. The raster data is then input to the control part 141 of the image recording apparatus 14 and the image recording apparatus 14 records an image to the recording medium 9 in accordance with the raster data.

FIG. 15 illustrates an original image indicated by original image data. Data of each character is target vector data in which the outline of the character is represented by vector data. FIG. 16A illustrates an image obtained when only thinning processing is performed on the original image data. In the image in FIG. 16A, lines are broken, and the character structure is not maintained. FIG. 16B illustrates an image obtained when only central lines are acquired from the original image data. Leaving only the central lines fails to maintain the character style.

FIG. 17 illustrates a result obtained by the vector data processor 12 processing the original image data in FIG. 15. In the image in FIG. 17, figures serving as characters can be thinned without lines becoming broken, and the character style is substantially maintained. This consequently prevents characters from thickening during rasterization and allows recording of an image close to the original image. Using central lines also prevents end portions from becoming retracted due to thinning.

The processing performed by the vector data processor 12 can prevent lines from being thickened not only at the time of rasterization but also at the time of image recording. FIG. 18A illustrates characters represented in a font, FIG. 18B illustrates characters whose outlines are represented by vector data, and FIG. 18C illustrates characters represented by vector data that has been processed by the vector data processor 12. In the case of direct display of data, there is no significant difference between FIG. 18A and FIG. 18B, whereas characters in FIG. 18C are thinned without lines becoming broken after the thinning processing and the acquisition of central lines. Hereinafter, the processing performed by the vector data processor 12 is referred to as "broken line prevention thinning processing."

Figures 20B, 20C, 21:
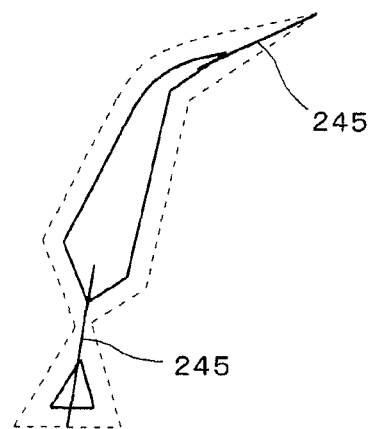
FIG. 20B illustrates characters in FIG. 19B that have been recorded.
FIG. 20C illustrates characters in FIG. 19C that have been recorded.
FIG. 21 illustrates another example of processing performed by a central line acquiring unit.

FIGS. 19A to 19C illustrate characters represented by data obtained by rasterizing the data in FIGS. 18A to 18C. The rasterization causes no change in the characters in FIG. 19A, but thickens the characters in FIG. 19B. The characters in FIG. 19C are also thickened, but the amount of thickening is smaller than that in FIG. 19A. FIGS. 20A to 20C illustrate results obtained by actually recording images with an inkjet method using the raster data representing FIGS. 19A to 19C. The spread of ink causes all of the characters to be thicker than those represented by the raster data. In particular, the characters in FIG. 20B are greatly thickened. The characters in FIG. 20C are less thickened than those in FIG. 20A. Thus, the broken line prevention thinning processing performed in consideration of possible ink spread by the vector data processor 12 enables appropriate image recording.

Note that this processing of the vector data processor 12 also allows other image recording apparatuses using methods other than the inkjet method to appropriately record images even if thickening or spreading of the figures occurs during image recording.

A target figure whose outline is represented by target vector data is preferably a figure that can possibly be broken due to thinning. In other words, the target figure preferably includes a linear figure having a thickness (to be precise, a solid figure). The target figure may be a combination of a plurality of linear figures having thicknesses. To be more precise, the target figure includes a linear figure having a varying thickness. In particular, the target figure is preferably a figure that represents a character as described in the above embodiment. The above-described processing is suited to small characters (e.g., characters having a size of 5 points or less) that are not suited to being thinned. The vector data processor 12 can thin the target figure while preventing lines from becoming broken and can approximate the shape of a rasterized figure to the shape of a figure indicated by outline data.

The vector data processor 12 that performs processing prior to rasterization can further achieve various effects. For example, even if characters or other figures (hereinafter, referred to as "characters, or the like") that are indicated by the target vector data 231 overlap with the background image, the vector data processor 12 can readily thin the characters or the like while preventing lines from becoming broken. Performing processing for each color component makes it easy to thin characters or the like that have colors while preventing lines from becoming broken. Such characters or the like may have intermediate densities. Additionally, the broken line prevention thinning processing does not require the RIP part 13 to change the way of rasterization. Since the processing performed by the vector data processor 12 is performed prior to rasterization, the processing time of this processing is basically independent of the recording resolution.

In the example in FIG. 4, figure element data pieces 211 that are included in at least one of the layers 210 are all target vector data 231 to be processed. The operation of adding "@CHOKE@," which indicates the broken line prevention thinning processing, to the end of the name of a layer 210 is equivalent to the operation of selecting the figure elements belonging to the layer 210 as target figures. This simplifies selection of data to be processed. Specifying the amount of thinning following "@CHOKE@" allows the amount of thinning for similar targets to be specified collectively, thus improving operability.

The figure element data pieces 211 belonging to the layers 210 are not necessarily always vector data, and the layers 210 may include other types of figure element data pieces 211. In this case, the determination in step S12 causes the procedure to skip steps S13 to S15 for a figure element data piece 211 that is not data to be processed. In other words, operability in the case of generating the original image data 200 improves if all vector data that indicates outlines of figures, among figure element data pieces 211 that are included in at least one of the layers 210, are target vector data 231.

The original image data 200 does not necessarily always have a structure including the layers 210, and target figures may be selected independently of the layers 210. In this case, the display unit 111 may display a plurality of figure elements indicated by the original image data 200, and the input part 112 may accept an operation of selecting any of figures as a target figure to add to the corresponding figure element data piece 211 information indicating that the figure element data piece 211 is target vector data 231. This allows only a specific figure element data piece 211 to be processed appropriately. For example, it is possible to perform the broken line prevention thinning processing on only part of a character string. Using the layers 210 also facilitates selection of only a specific area as a target to be processed.

FIG. 21 illustrates another example of the processing performed by the central line acquiring part 302. In the example in FIG. 21, the central line 245 is part of the central line 245 illustrated in FIG. 12. The central line 245 is generated only in portions that include positions where the target FIG. 241 is broken due to the thinning processing and in portions that include inwardly retracted ends. Acquiring only part of the central line 245 of the target FIG. 241 allows the central line acquiring part 302 to considerably reduce the amount of computations. To implement this processing, the central line acquiring part 302 acquires positions where the target figure is broken due to thinning processing and new vertices appear, from the thinning part 301. The central line acquiring part 302 does not necessarily have to generate the central line 245 in all of the portions including positions where the target FIG. 241 is broken due to the thinning processing and the portions including retracted ends, and may generate the central line 245 in only some of these portions. Preferably, the central line 245 is acquired in at least positions where the target figure is broken. In this way, the central line acquiring part 302 acquires at least part of the central line of the target figure.

Various techniques may be employed to acquire the central line. For example, the central line may be acquired by searching for a vertex that is closest to each vertex and connecting intermediate points between the vertices and the closest vertices. The central line is a line that extends along the length of a linear figure having a thickness, and does not necessarily have to be the center line in the strict sense as long as it indicates approximately the center of the linear figure. The central line may be a curved line.

Figure 22:
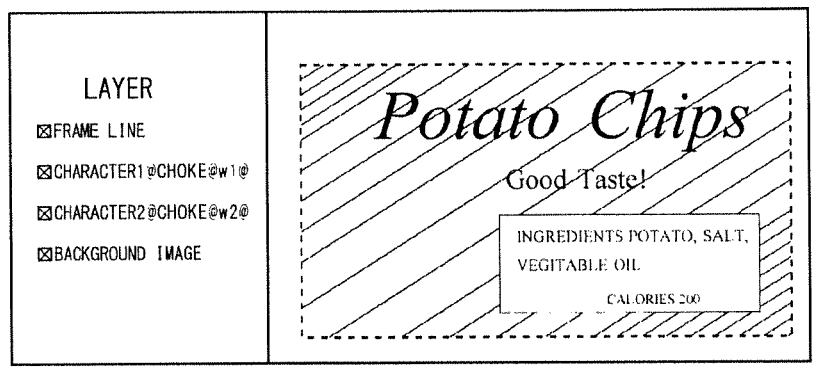
FIG. 22 illustrates another example of how to specify the amount of thinning.

FIG. 22 illustrates another example of how to specify the amount of thinning. In the example in FIG. 22, the amount of thinning is not a specific numerical value and is specified by a symbol such as "w1@." Such specification is suited to the case where the user of the image recording apparatus 14 needs to specify the amount of thinning. In other words, in cases where the characteristics of the image recording apparatus 14 are unknown to the user of the original image data generation apparatus 11 or where the type of image recording apparatus 14 to be used has not yet been determined, symbols are used, such as to indicate that the amount of thinning has not been determined, or to indicate an approximate degree of thinning but not a specific value.

The thinning part 301 prepares a thinning amount table 311 in advance as illustrated in FIG. 7. The thinning part 301 checks whether the value of a variable that indicates the amount of thinning associated with the target vector data 231 has been determined. If the value of the variable has not been determined or if an approximate amount of thinning has been determined but a precise value therefor has not been determined, the thinning part 301 references this information and the thinning amount table 311 to determine a specific amount of thinning that corresponds to the target vector data 231. For example, the thinning amount table 311 stores various amounts of thinning that correspond to various degrees of thinning or various cases such as where the amount of thinning has not been determined and to the type of the image recording apparatus 14. Use of the thinning amount table 311 enables automatic determination of an appropriate amount of thinning.

If the amount of thinning has not been determined, the vector data processor 12 may display this information on its display part or the like, and the thinning part 301 may accept input of the amount of thinning that is specified by a user. Alternatively, a configuration may be adopted in which the thinning part 301 accepts such user input only when the target vector data 231 is associated with a condition that is not stored in the thinning amount table 311.

Figure 23:
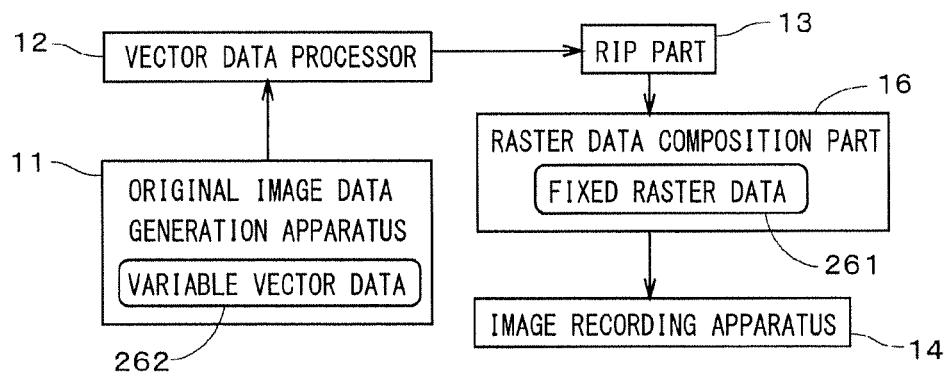
FIG. 23 illustrates another example of the image recording system.

FIG. 23 illustrates another preferable example of the image recording system 1. This image recording system 1 additionally includes a raster data composition part 16 that is disposed between the RIP part 13 and the image recording apparatus 14. Typically, characters on recording material are often variable information. For example, a unique manufacturing number printed on a food package is variable information, and an address printed on an invoice is variable information. Thus, the target vector data 231 is often variable information, and the other figure element data pieces 211 are often fixed images.

In the image recording system 1 in FIG. 23, the RIP part 13 converts fixed figure element data pieces 211 such as the background or frame lines into raster data in advance and stores this raster data as fixed raster data 261 in the raster data composition part 16. On the other hand, the original image data generation apparatus 11 specifies target vector data 231 as variable information in advance. Hereinafter, such target vector data 231 is referred to as "variable vector data 262." The original image data 200 preferably includes a layer 210 that includes only the variable vector data 262. The variable vector data 262 is subjected to the broken line prevention thinning processing, which is performed by the vector data processor 12 as described above, and then converted into raster data by the RIP part 13. Hereinafter, this raster data is referred to as "variable raster data."

The variable raster data is combined with the fixed raster data 261 prepared in advance, by the raster data composition part 16. Hereinafter, the raster data resulting from combining the two pieces of raster data is referred to as "composite raster data." The image recording apparatus 14 records an image to the recording medium 9 in accordance with this composite raster data.

The original image data generation apparatus 11 inputs the variable vector data 262 to the vector data processor 12 one after another while changing the variable vector data 262. The processed variable vector data 262 is converted into variable raster data and combined with the fixed raster data 261. This allows the image recording apparatus 14 to repeatedly record images in which only variable information has been changed, to the recording medium 9.

In such a case of repeatedly recording images, the vector data processor 12 and the RIP part 13 only need to process the variable vector data 262. This reduces the amount of processing performed by the image recording system 1, thus improving the speed of recording and reducing the cost of recording.

The image recording system 1 can be modified in various ways.

For example, the display part of the vector data processor 12 may display processed figures so that the processing results can be checked. The vector data processor 12 may have a RIP function to display and check rasterized images.

The original image data generation apparatus 11 may have a function of converting a font into vector data indicating outlines. Similarly, the original image data generation apparatus 11 may have a function of outlining strokes to form a closed figure. This reduces the possibility of occurrence of thickening during image recording.

A configuration may be adopted in which the vector data processor 12 processes only vector data of a specific color component (e.g., a black component in which lines that are broken are highly noticeable).

The image recording apparatus 14 may record images to a recording medium of a predetermined size, such as cut paper. The ejection unit 3 may move in the Y direction relative to a recording medium. In other words, a recording medium and the ejection unit 3 may move relative to each other.

The image recording apparatus 14 may be a device other than an inkjet device, such as an electrophotographic device, for example. The image recording apparatus 14 may also be a computer to plate (CTP) device or an image setter, or may be a combination of a CTP device or an image setter and any type of printer (e.g., an offset printer, a flexography printer, a letterpress printer, or a gravure printer).

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2014-028315 filed in the Japan Patent Office on Feb. 28, 2014, the entire disclosure of which is incorporated herein by reference.

REFERENCE SIGNS LIST

1 Image recording system
9 Recording medium
12 Vector data processor
13 RIP part
14 Image recording apparatus
16 Raster data composition part
111 Display part
112 Input part
150 Computer
200 Original image data
210 Layer
211 Figure element data (piece)
231 Target vector data
232 Thinned data
233 Central line data
241 Target FIG.
245 Central line
246 Composite FIG.
261 Fixed raster data
301 Thinning part
302 Central line acquiring part
303 Superimposing part
311 Thinning table
810 Program
S11 to S18 Step

The invention claimed is:

1. A vector data processor for processing vector data before the vector data is converted into raster data for image recording, comprising:
a thinning part that processes target vector data indicating an outline of a target figure that includes a linear figure having a thickness, to acquire thinned data that is vector data indicating a thinned figure obtained by moving line segments of said target figure to thin said target figure by an amount of thinning, said thinned figure being a closed figure formed by line segments;
a central line acquiring part that processes said target vector data to acquire central line data that is vector data indicating at least part of a central line of said target figure; and
a superimposing part that generates data that includes an instruction to record a combined figure obtained by superimposing said thinned figure and said central line one on the other.

2. The vector data processor according to claim 1, wherein said target figure represents a character.

3. The vector data processor according to claim 1, wherein original image data includes a plurality of layers,
all figure element data that is vector data indicating an outline of a figure, out of figure element data that is included in at least one of said plurality of layers, is said target vector data, and
at least one layer does not include target vector data.

4. The vector data processor according to claim 1, wherein said central line acquiring part acquires only part of the central line of said target figure, and
said part of the central line includes the central line at a position where said target figure is broken in the processing performed by said thinning part.

5. The vector data processor according to claim 1, wherein said thinning part checks whether a value of a variable that indicates an amount of thinning associated with said target vector data has been determined, and, if the value has not been determined, determines an amount of thinning that corresponds to said target vector data or receives input of an amount of thinning that is specified by a user.

6. A vector data processing method of processing vector data before the vector data is converted into raster data for image recording, the method comprising:
processing target vector data that indicates an outline of a target figure that includes a linear figure having a thickness, to acquire thinned data that is vector data indicating a thinned figure obtained by moving line segments of said target figure to thin said target figure by an amount of thinning, said thinned figure being a closed figure formed by line segments;
processing said target vector data to acquire central line data that is vector data indicating at least part of a central line of said target figure; and
generating data that includes an instruction to record a combined figure obtained by superimposing said thinned figure and said central line one on the other.

7. The vector data processing method according to claim 6, wherein
said target figure represents a character.

8. The vector data processing method according to claim 6, wherein
original image data includes a plurality of layers,
all figure element data that is vector data indicating an outline of a figure, out of figure element data that is included in at least one of said plurality of layers, is said target vector data, and
at least one layer does not include target vector data.

9. The vector data processing method according to claim 6, wherein
only part of the central line of said target figure is acquired in said acquiring said central line data, and
said part of the central line includes the central line at a position where said target figure is broken in said thinned figure.

10. The vector data processing method according to claim 6, wherein
said acquiring said thinned data includes checking whether a value of a variable that indicates an amount of thinning associated with said target vector data has been determined, and, if the value has not been determined, determining an amount of thinning that corresponds to said target vector data.

11. A non-transitory computer-readable medium that stores a program for causing a computer to process vector data before the vector data is converted into raster data for image recording,
said program causing said computer to execute:
processing target vector data that indicates an outline of a target figure that includes a linear figure having a thickness, to acquire thinned data that is vector data indicating a thinned figure obtained by moving line segments of said target figure to thin said target figure by an amount of thinning, said thinned figure being a closed figure formed by line segments;
processing said target vector data to acquire central line data that is vector data indicating at least part of a central line of said target figure; and
generating data that includes an instruction to record a combined figure obtained by superimposing said thinned figure and said central line one on the other.

12. The non-transitory computer-readable medium according to claim 11, wherein
said target figure represents a character.

13. The non-transitory computer-readable medium according to claim 11, wherein
original image data includes a plurality of layers,
all figure element data that is vector data indicating an outline of a figure, out of figure element data that is included in at least one of said plurality of layers, is said target vector data, and
at least one layer does not include target vector data.

14. The non-transitory computer-readable medium according to claim 11, wherein
only part of the central line of said target figure is acquired in said acquiring said central line data, and
said part of the central line includes the central line at a position where said target figure is broken in said thinned figure.

15. The non-transitory computer-readable medium according to claim 11, wherein
said acquiring said thinned data includes checking whether a value of a variable that indicates an amount of thinning associated with said target vector data has been determined, and, if the value has not been determined, determining an amount of thinning that corresponds to said target vector data.

\* \* \* \* \*